March 20, 1956 K. W. ENGLAND 2,738,862
COMBINATION BRAKE AND THROTTLE ACTUATOR FOR VEHICLES
Filed June 18, 1952 2 Sheets-Sheet 1
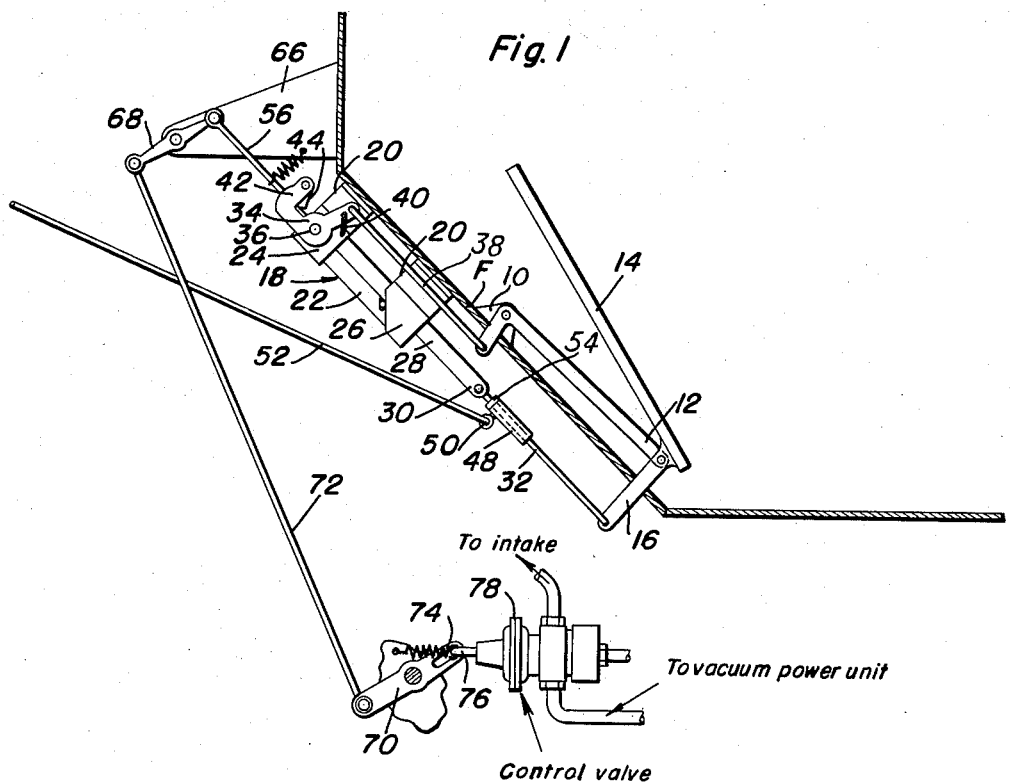
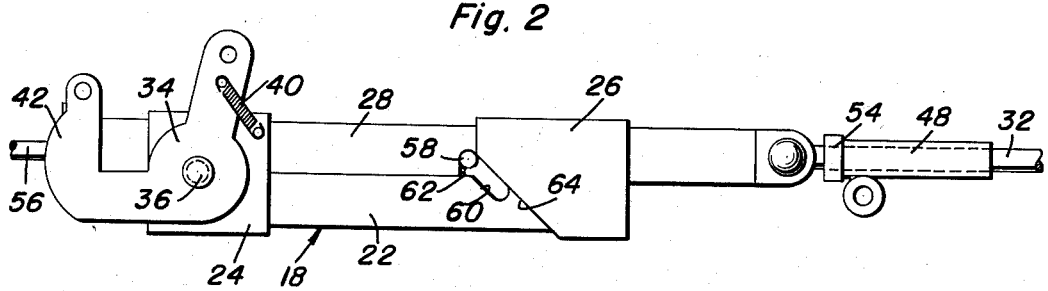
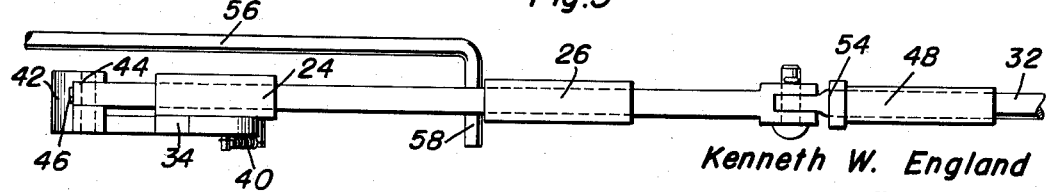
Kenneth W. England
INVENTOR.

March 20, 1956  K. W. ENGLAND  2,738,862
COMBINATION BRAKE AND THROTTLE ACTUATOR FOR VEHICLES
Filed June 18, 1952  2 Sheets-Sheet 2

Kenneth W. England
INVENTOR.

United States Patent Office 2,738,862
Patented Mar. 20, 1956

2,738,862

COMBINATION BRAKE AND THROTTLE ACTUATOR FOR VEHICLES

Kenneth W. England, Campbellton, Tex.

Application June 18, 1952, Serial No. 294,122

9 Claims. (Cl. 192—3)

This invention relates to new and useful improvements in brake and throttle operators for vehicles and the primary object of the present invention is to provide a single actuator for selectively activating the brakes and throttle of a vehicle.

Another important object of the present invention is to provide a combination brake and throttle actuator for vehicles including a pedal that is operatively connected to a brake operator and a throttle operator, whereby depressing one end of the pedal will open the throttle of the vehicle, and depressing of the other end will apply the brakes.

Yet another object of the present invention is to provide a brake and throttle actuator including a pedal activated sliding bar that is operatively connected to a brake operator and a throttle operator, so that movement of the bar in one direction will activate the brake operator without effecting the throttle operator, whereas movement of the bar in an opposite direction will effect an operation of the throttle operator without actuation of the brake operator.

Another feature of the present invention is to provide a device of the aforementioned character that is quickly and readily mountable on a vehicle to replace the accelerator pedal and brake pedal in a convenient manner.

A further object of the present invention is to provide a combined brake and throttle actuator wherein the brake unit will remain applied until the single pedal is depressed at its forward end to activate the throttle and release the brake unit, whereby the device will function as a hill holder as well as a combined brake and throttle actuator.

A still further aim of the present invention is to provide a braking or combined braking and throttling device for vehicles that is simple and practical in construction, strong and reliable in use, small and compact in structure, efficient and durable in operation, inexpensive to manufacture, install and service and otherwise well adapted for the purposes for which the same is intended.

Other objects, features and advantages reside in the details of construction, and operation as more fully hereinafter described and claimed, reference being had to the accompany drawings forming part hereof, wherein like numerals refer to like parts throughout, and in which:

Figure 1 is a vertical sectional view of a vehicle floor board and showing the present invention mounted thereon and connected to the throttle operator and brake operator;

Figure 2 is an enlarged detail elevational view of the operating bar, guide and abutment forming part of the invention and showing the bar in its neutral position;

Figure 3 is a plan view of Figure 2;

Figure 4:
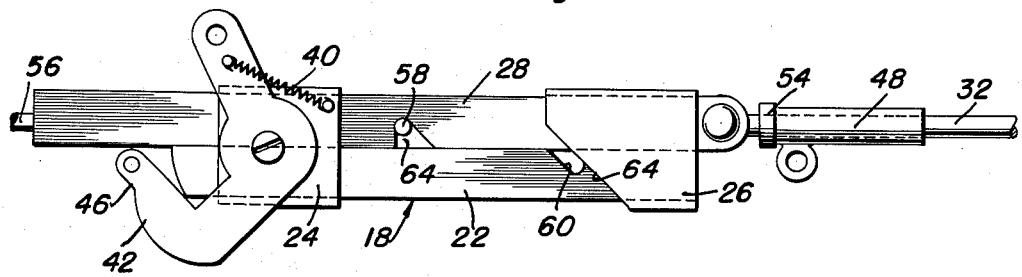
Figure 4 is a view similar to Figure 2, but showing the bar in its approximate full brake applying position.

Referring now to the drawings in detail, wherein for the purpose of illustration, there is disclosed a preferred embodiment of the present invention, the numeral 10 represents a mounting bracket to which the apex of a bell crank 12 is pivotally secured. The rear end of a vertically swingable pedal 14 overlies the bracket and its rear end supports a depending lateral projection or arm 16 whose upper end is pivoted to the upper leg of the bell crank.

A guide 18 is secured to the underside of a floor board F by suitable brackets 20. The guide includes a stationary bar 22 whose ends support forward and rear channels 24 and 26.

An operating bar 28 is slidably received on the upper edge of bar 22 and within the channels 24 and 26. The rear bifurcated end 30 of the bar 28 is pivoted to a pitman or link 32 whose rear end is pivoted to the lower end of projection 16.

The bight portion of a U-shaped member 34 is pivoted to one wall of the forward channel 24 by a pin 36. The rear leg of the member 34 is connected to the lower leg of the bell crank 12 by a pitman or link 38, and the rear leg of member 34 is also connected to channel 24 by a coil spring 40 that urges the forwardly extending bight of member 34 to a position where it parallels bars 22 and 28.

The forward leg of member 34 is formed with a bifurcated upper end to pivotally support a swinging lug 44 that is urged rearwardly by a leaf spring 46 suitably held by the forward leg.

A sleeve 48 slidably receives the pitman 32 and is pivotally connected, as at 50, to the throttle operator 52. An abutment 54 is fixed to the pitman 32 in front of sleeve 48 so that as the forward end of the pedal 14 is depressed, the bar 28 will be pulled rearwardly and abutment 54 will engage sleeve 48 to move the sleeve 48 rearwardly and the operator 52 to its throttle open position.

A brake operator is operatively connected to the bar 28 and includes a rod 56 having a laterally projecting rear end 58 that is selectively receivable in downwardly and rearwardly inclined slots 60 and 62 in the bars 22 and 28, respectively. The forward lower corner of the channel 26 is cut off to form a cam surface 64 that extends along the upper edge of the slot 60 and transversely across bar 28.

A bracket 66 is mounted behind the dash panel of the vehicle or truck and pivotally supports the central portion of a vertically swingable link 68. The upper end and rear end of link 68 is pivoted to the forward end of rod 56 and the forward and lower end of link 68 is connected to the forward end of a second vertically swingable link 70 by a pitman 72. The rear slotted end 74 of link 70 is connected to the operating arm 76 of a control valve 78 so that when the arm 76 is pulled forwardly to open valve 78, the brakes of the vehicle will be applied.

Figure 5:
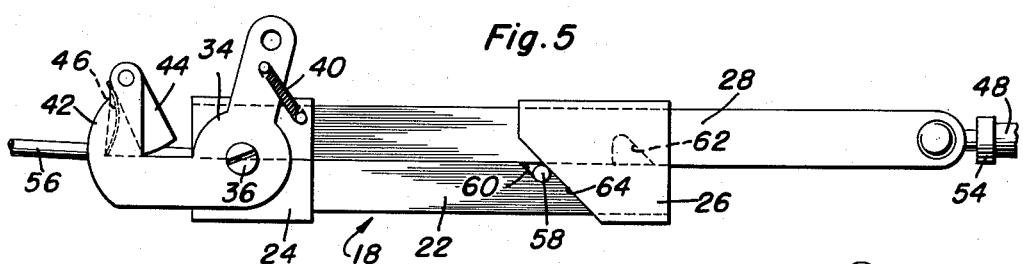
Figure 5 is a view similar to Figure 2, but showing the bar in its open throttle position.
Figure 6:
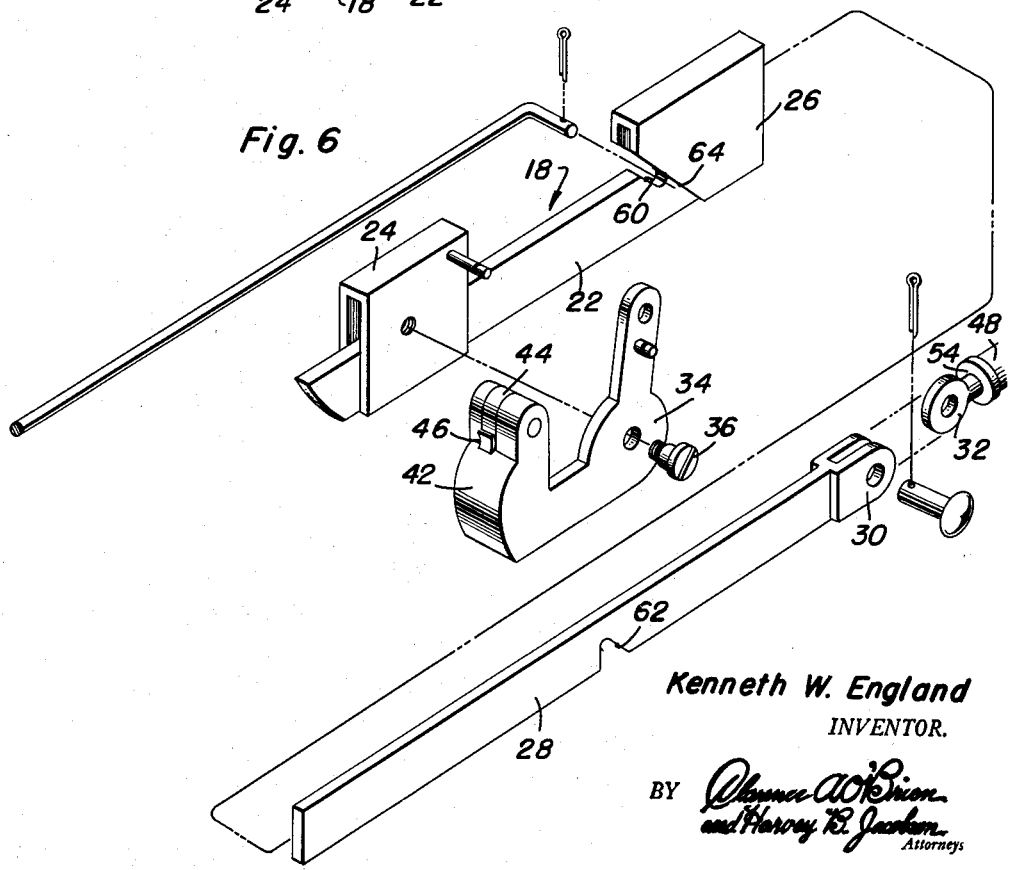
Figure 6 is a group perspective view of the elements shown assembled in Figures 2 through 5.

In practical use of the present invention shown in Figures 1 through 6, inclusive, the device is in a neutral position as illustrated in Figure 2 with the forward end of bar 28 engaged with and depressing lug 44 and with slots 60 and 62 in registry, and end 58 is positioned in slot 62 as a result of a spring (not shown) acting on arm 76 and urging the valve 78 to its opened position.

When the forward end of the pedal 14 is depressed to accelerate the vehicle (Figure 5), arm 16 swings rearwardly which causes bar 28 to be pulled rearwardly, whereupon abutment 54 engages and pulls the sleeve 48 rearwardly. As the bar 28 is pulled rearwardly, end 58 of rod 56 rides against cam surface 64 and is urged into slot 60 against action of the spring acting on arm 76. As the sleeve 48 is pulled rearwardly, the operator 52 will be moved to throttle open position.

In order to apply the brakes (Figure 4), the rear end of pedal 14 is depressed and the forward end is released to swing lower arm of 12 forwardly and push pitman 38 forwardly. This moves the forward leg of member 34 out of the path of bar 28 so that this bar can move forwardly by movement of arm 16 caused by depression of the rear end of the pedal 14. As notch or slot 62 passes over slot 60, end 58 of rod 56 will pass into slot 62 so that rod 56 will move forwardly with the bar 28. Since rod 56 is moving forwardly, a downward movement of pitman 72 is effected to pull end 74 and arm 76 forwardly, opening valve 78, and applying the brakes. The brakes will remain applied until the forward end of the pedal is again depressed.

In the event the brakes are electrically actuated rather than pneumatically actuated, the valve 78 may be replaced by a switch whose arm (such as spring urged arm 76) is connected to the slotted end 74 of link 70. Obviously, the pitman 72 and link 70 are capable of being attached to other brake actuators.

Having described the invention, what is claimed as new is:

1. A combined brake and throttle actuator comprising a mounting bracket, a bell crank pivoted at its apex to the bracket, a foot pedal having a rigid lateral projection at one end pivoted to one leg of the bell crank, a guide mountable below a vehicle floor board, a bar slidably carried by the guide and pivotally connected at one end to the projection, a brake actuator means including a rod selectively engageable with and releasable from said bar, stop means carried by the guide preventing sliding movement of the bar to a brake applying position when the end of the pedal, remote from the projection, is depressed, means connecting the other leg of the bell crank to the stop means to move the stop means out of the path of the bar as the end of the pedal having the projection is depressed, said rod being engaged with, to move as a unit with, the bar as the bar is moved past the stop means, and a throttle operator actuated by the bar as the end of the pedal remote from the projection is depressed.

2. The combination of claim 1 wherein said guide includes a notch for receiving the rod, said bar also having a notch for receiving the rod and for registering with the notch in the guide, whereby the rod may move from one notch to the other, and means carried by the guide for moving the rod from the notch in the bar into the notch in the guide as the end of the pedal remote from the projection is depressed.

3. The combination of claim 2 wherein said rod moving means consists of a cam surface leading to the notch in the guide and extending transversely across the bar.

4. A combined brake and throttle actuator comprising a bracket, a bell crank pivoted to the bracket, a pedal having forward and rear ends and a depending lateral projection at its rear end pivoted to the bell crank, the forward end of said pedal being depressed to a throttle position and the rear end of said pedal being depressed to a brake applying position, a guide mountable beneath a vehicle floor board in front of the bracket and having forward and rear portions, an actuating bar slidably carried by the guide and connected at its rear end to the projection to be moved rearwardly as the forward end of the pedal is depressed and forwardly as the rear end of the pedal is depressed, a brake operator engaged by the bar and activated to a brake applying position during forward movement of the bar, and a throttle operator activated to a throttle opening position during rearward movement of the bar.

5. The combination of claim 4 and abutment means carried by the forward portion of the guide engaging the bar when the pedal is in a neutral position with neither end thereof depressed, and means connecting the abutment means to the bell crank for movement of the abutment means out of the path of the bar as the rear end of the pedal is depressed.

6. The combination of claim 5 wherein said means connecting the abutment means to the bell crank comprises a pitman, said bell crank being pivoted at its apex to the bracket and having one of its legs pivoted to the projection and its other leg pivoted to one end of the pitman.

7. A combined brake and throttle actuator comprising a bracket, a bell crank pivoted to the bracket, a pedal having forward and rear ends and a depending lateral projection at its rear end pivoted to the bell crank, the forward end of said pedal being depressed to a throttle position and the rear end of said pedal being depressed to a brake applying position, a guide mountable beneath a vehicle floor board in front of the bracket and having forward and rear portions, an actuating bar slidably carried by the guide and connected at its rear end to the projection to be moved rearwardly as the forward end of the pedal is depressed and forwardly as the rear end of the pedal is depressed, a brake operator including a rod having a rear laterally projecting end, said guide having a slot therein for receiving the projecting end of said rod, said slot extending inwardly from one edge of the bar at an acute angle to the longitudinal axis of said bar, said bar also having a slot for receiving the said end of said rod, the slot in said bar being disposed in parallelism with the slot in said guide, said slots adapted to register with each other to permit transfer of the said end of the rod from one slot to the other, said end of said rod adapted to pass from the slot in the bar into the slot in the guide as the bar is moved rearwardly and said end of said rod adapted to pass into the slot in the bar from the slot in the guide as the bar is moved forwardly, means attached to the guide for forcing the said end of said pin from the slot in the bar into the slot in the guide as the bar is moved rearwardly, and a throttle operator activated to a throttle open position during rearward movement of the bar.

8. The combination of claim 7 wherein said pin forcing means comprises a cam surface having a downwardly and rearwardly inclined edge paralleling the slot in the guide and disposed at the upper edge of the slot in the guide and extending across the bar.

9. The combination of claim 7 and means swingably mounted on the forward portion of the guide forming an abutment for the bar when the pedal is in its neutral position with neither end depressed, and means connecting the swingably mounted means to the bell crank to move the swingably mounted means out of the path of the bar as the rear end of the pedal is depressed.

References Cited in the file of this patent

UNITED STATES PATENTS

| | | |
|---|---|---|
| 1,990,828 | Jarvis | Feb. 12, 1935 |
| 2,109,101 | Clark | Feb. 22, 1938 |
| 2,411,167 | Perry | Nov. 19, 1946 |
| 2,536,854 | Parker | Jan. 2, 1951 |
| 2,596,998 | Van Hilson | May 20, 1952 |